Dec. 12, 1961　　　V. N. BREDEHOEFT　　　3,013,237
ELECTRODE PROTECTORS
Filed Aug. 17, 1959
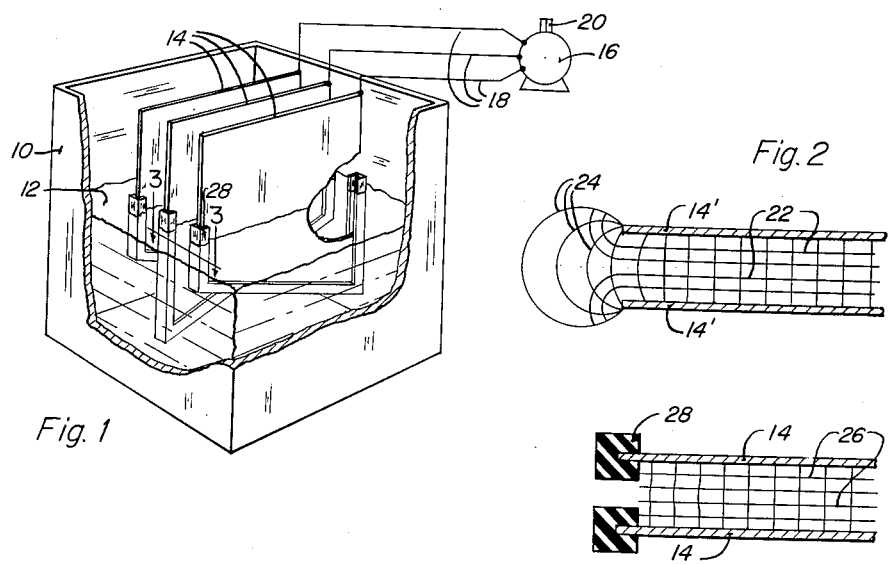
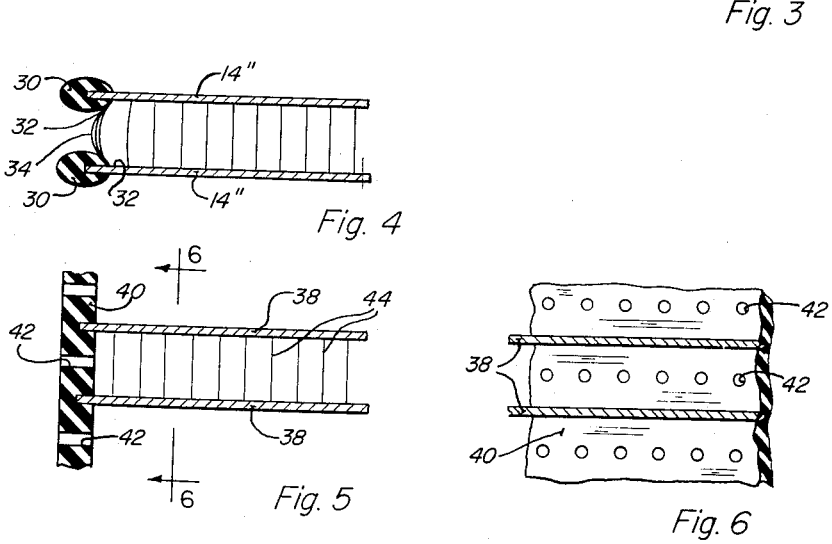
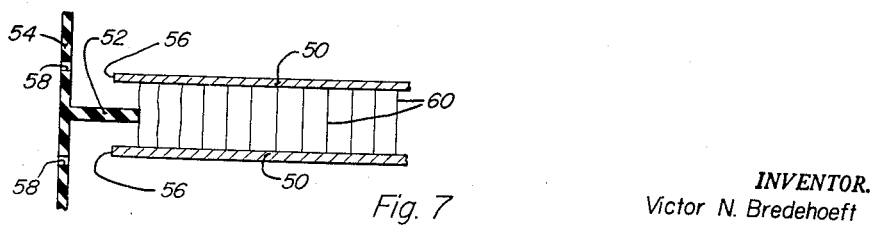
INVENTOR.
Victor N. Bredehoeft
BY
Buckhorn, Cheatham & Blore
ATTORNEYS

United States Patent Office 3,013,237
Patented Dec. 12, 1961

3,013,237
ELECTRODE PROTECTORS
Victor N. Bredehoeft, 1600 Western Ave.,
Corvallis, Oreg.
Filed Aug. 17, 1959, Ser. No. 834,100
10 Claims. (Cl. 338—80)

The present invention relates to electrical apparatus and more particularly to the protection of electrode assemblies.

In certain types of electrical apparatus, such as liquid rheostats having flat, platelike electrodes immersed in an electrolyte, it has been found that undue corrosion takes place along the edge portions of the electrodes. The corrosion adversely affects the life of the electrodes and in many instances is of such seriousness as to make uneconomical an installation which would otherwise be suitable.

It is an object of the present invention to provide means of preventing undue corrosion of electrodes.

More particularly, it is an object of the present invention to provide means to prevent undue corrosion along the edge portions of plate electrodes.

Other objects and advantages of the invention will become more apparent hereinafter.

In accordance with an illustrated embodiment of the present invention, electrodes of a liquid rheostat are provided with a coating of electrical insulating material along the edge portions thereof and which coating substantially eliminates excessive current concentration at such edge portions thereby eliminating in turn undue corrosion of the edge portions.

For a more detailed description of the invention, reference is made to the following specification and accompanying drawings wherein:

FIG. 1 is a schematic perspective view of a liquid rheostat constructed in accordance with the invention;

FIG. 2 is a sectional view of unprotected electrodes showing the apparent cause of corrosion of the edges of such electrodes;

FIG. 3 is a sectional view taken substantially along line 3—3 of FIG. 1 showing the apparent effect of protecting electrodes in accordance with a preferred embodiment of the invention;

FIG. 4 is a sectional view taken through a pair of electrodes showing the apparent effects of another type of edge protecting arrangement;

FIG. 5 is a sectional view through still another set of electrodes showing a further embodiment of the invention;

FIG. 6 is a sectional view taken along line 6—6 of FIG. 5; and

FIG. 7 is still another sectional view illustrating a further embodiment of the invention.

The invention is illustrated in connection with a specific application in which it has found utility, namely in the protection of electrodes of an electrical rheostat shown schematically in FIG. 1. Such a rheostat is shown in greater detail in Hayes Patent No. 2,734,458 and as taught in such patent, such rheostat includes a tank 10 containing a body of electrolyte 12 in which is immersed a plurality of electrodes 14 which preferably are plate like members mounted in spaced apart parallel relation as shown. As is well known, such electrodes can be used to control the speed of a motor such as wound rotor, induction type motor indicated at 16 by connecting the electrodes 14 through suitable conductors 18 to the terminals of the rotor of such a motor. The windings of the stator are connected to a suitable source of electric power through conductors 20.

Because of the inherent qualities of the circuitry in an arrangement such as shown, different voltages are applied to the electrodes 14 whereby an electric current flows through the electrolyte 12 between the plates 14. It has been found that the electrodes corrode rapidly along their edge portions and it has been theorized that this occurs because of a concentration of current at such points. Referring to FIG. 2, it is theorized that when different potentials are applied to a pair of electrodes 14′ immersed in an electrolyte, a potential field between the plates is developed as represented by the lines 22 indicating lines of equal potential. The potential gradient thus established is believed to cause current to flow as indicated by the lines 24 and it will be noted that there is a concentration of current flow at the very edges of the plates 14′ and this would, of course, cause rapid corrosion of the edge portions.

Referring now more particularly to FIGS. 1 and 3, it has been found that excessive corrosion at the electrodes 14 of the rheostat at any particular area can be prevented by providing a protective barrier along the edge portions of the electrodes which prevents flow of current from the edge portions of the electrodes having directional components outwardly of the edges of the electrodes and parallel to the electrodes. In accordance with a preferred embodiment of the invention, such a barrier comprises insulating members 28 of rectangular cross section mounted along the edge portions of the electrodes 14 as shown in FIGS. 1 and 3. With such insulators the current flow between the electrodes is seemingly distributed substantially evenly therebetween as indicated by the lines 26 in FIG. 3. As will be apparent from FIG. 3, the members 28 define an insulating surface extending at right angles to the surface of the electrodes 14 so as to prevent current flow from the surface of the electrodes immediately adjacent the insulators having directional components toward the covered edge of the electrode and parallel to the surface thereof.

The importance of eliminating the flow of current from the edge portions of the electrodes outwardly of the edges of the electrodes and parallel to the electrodes is demonstrated in FIG. 4 wherein there is shown a pair of electrodes 14″ provided with teardrop shaped insulating members 30 on the edges thereof such as may be formed by dipping the edges of the electrodes in a liquid plastic material. It was found that when electrodes were supplied with an insulating barrier 30 as shown in FIG. 4 that though some improvement resulted excessive corrosion of the electrodes took place along the areas 32 where the insulator met the bare surface of the electrodes 14″. It is theorized that this occurs because of the presence of current flow arising at such areas and having directional components extending outwardly of the edges of electrodes and parallel to the electrodes as represented by the lines 34.

When barriers of rectangular cross section such as shown at 28 in FIG. 3 were substituted for the insulators 30, it was found that the excessive corrosion previously observed was eliminated and that the electrodes eroded substantially evenly over their entire surface indicating that the current density was substantially evenly distributed. This is, of course, essential in prolonging the useful life of the electrodes.

A modification of the invention is illustrated in FIGS. 5 and 6 where there is shown a pair of parallel, flat electrodes 38 having their edge portions embedded in a sheet of insulating material 40 which may be provided with openings 42 to permit the circulation of electrolyte between the pairs of electrodes. The sheet 40 prevents the development of current flow outwardly of the edge portions of the electrodes whereby the current flow is substantially evenly distributed as indicated by the lines 44.

A further embodiment of the invention is shown in FIG. 7 in connection with a pair of flat, parallel electrodes 50. Insulating means are cooperatively arranged with the electrodes 50 to provide a barrier to the flow of current from the edge portions of the electrodes having directional components outwardly of the edges parallel thereto, such insulating means comprising an insulating body 52 suitably mounted between the plates and extending outwardly therefrom and which is in contact with or joined to a further barrier or insulating body 54 spaced from but parallel to the edges 56 of the electrodes 50 to eliminate the conducting path around the outside edge of the insulating body 52. The barrier 54 is preferably provided with apertures 58 to facilitate circulation of electrolyte between the electrodes 50. The current flow between the electrodes is thus substantially evenly distributed as indicated by the lines 60.

While the invention has been described with particular reference to the use with the electrodes of a liquid rheostat, the invention obviously has wider application and I claim as my invention all such modifications in arrangement and detail as come within the true spirit and scope of the appended claims.

I claim:

1. An electrical device comprising a body of electrolyte, a pair of flat, parallel plate like electrodes immersed in said electrolyte in side-by-side, laterally spaced relation for connection to sources of different voltage whereby an electrical current flows between said electrodes, and insulating means positioned in the path of all current flow from the edge portions of said electrodes having directional components outwardly of the edges of said electrodes and parallel to said electrodes thereby providing a barrier to such current flow.

2. An electrical device comprising a body of electrolyte, a pair of flat, parallel plate like electrodes immersed in said electrolyte in side-by-side, laterally spaced relation for connection to sources of different voltage whereby an electrical current flows between said electrodes, and insulating means adjacent the edge portions of said electrodes and extending between said electrodes intercepting all current flow between said electrodes from said edge portions having a component extending in the direction outwardly of an parallel to said electrodes.

3. An electrical system including a liquid rheostat comprising a pair of parallel, flat electrodes immersed in a body of electrolyte in side-by-side, laterally spaced relation, said electrodes having a different voltage applied to each whereby an electrical current flows between said electrodes, and insulating means covering the edge portions of each of said electrodes and extending from the surface of said electrodes substantially at right angles thereto providing a barrier to flow of electrical current from the opposed areas of said electrodes immediately next to said insulating means having directional components outwardly of the edges of said electrodes and parallel to said electrodes.

4. An electrical device comprising an electrolyte, a pair of parallel plate electrodes immersed in said electrolyte in side-by-side, laterally spaced relation, and a coating of non-conductive insulating material covering the edge portions of said electrodes.

5. A liquid rheostat comprising an electrolyte, a plurality of parallel, flat electrodes immersed at least partially in said electrolyte, said electrodes being in side-by-side, laterally spaced relation, each of said electrodes having a coating of non-conductive material along the immersed edge portions thereof.

6. An electrical device including a body of electrolyte and a pair of parallel, flat, plate electrodes immersed in said electrolyte for connection to sources of different voltages, and a pair of insulating bodies of rectangular cross section covering the edge portions of each of said electrodes.

7. A liquid rheostat comprising a pair of parallel, flat, plate electrodes and an insulating body of rectangular cross section secured to the edge portions of each of said electrodes.

8. An electrical device comprising a body of electrolyte, a pair of flat, parallel plate like electrodes immersed in said electrolyte in side-by-side, laterally spaced relation for connection to sources of different voltage whereby an electrical current flows between said electrodes, and insulating means adjacent the edge portions of said electrodes intercepting the lines of potential arcing beyond the edges of said electrode and preventing all current flow from said edges in the direction outwardly of the edges of said electrodes.

9. An electrical device comprising a body of electrolyte, a pair of flat, parallel plate electrodes immersed in said electrolyte in side-by-side laterally spaced relation, and a sheet of insulating material extending between said electrodes and covering the edge portions thereof.

10. An electrical device comprising a body of electrolyte, a pair of flat, parallel electrodes immersed in said electrolyte in side-by-side, laterally spaced relation, and insulating means cooperatively arranged with said electrodes and providing a barrier to flow of current from the edge portions of said electrodes having directional components outwardly of the edges of said electrodes and parallel to said electrodes, said means including a first insulating body adjacent to but spaced from the edges of said electrodes in overlapping arrangement and a second insulating body contacting said second body and extending therefrom inwardly between said electrodes.

References Cited in the file of this patent

UNITED STATES PATENTS

| | | |
|---|---|---|
| 2,713,726 | Dixson | July 26, 1955 |
| 2,713,727 | Balsam | July 26, 1955 |